United States Patent
Karanam et al.

(10) Patent No.: US 8,850,016 B1
(45) Date of Patent: Sep. 30, 2014

(54) PROVISIONABLE-SERVICES CLEARINGHOUSE FOR AUTHORIZING AND TRACKING A MOBILE DEVICE'S ACCESS TO MULTIPLE TYPES OF SERVICES AND MULTIPLE SERVICE PROVIDERS

(75) Inventors: Raghava Karanam, Olathe, KS (US); William E. White, Lees Summit, MO (US); Abhik Barua, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 373 days.

(21) Appl. No.: 13/070,054

(22) Filed: Mar. 23, 2011

(51) Int. Cl.
  *G06F 15/173* (2006.01)
(52) U.S. Cl.
  USPC ........ 709/226; 455/33.1; 455/410; 455/414.3
(58) Field of Classification Search
  CPC ....... H04W 12/12; H04W 4/003; H04W 4/18; H04L 67/306
  USPC ...................... 455/410, 33.1, 414.3
  See application file for complete search history.

(56) References Cited

U.S. PATENT DOCUMENTS

| | | | | |
|---|---|---|---|---|
| 5,564,068 A | * | 10/1996 | Nguyen | 455/433 |
| 5,953,653 A | * | 9/1999 | Josenhans et al. | 455/410 |
| 2005/0048957 A1 | * | 3/2005 | Casey et al. | 455/414.3 |
| 2008/0070550 A1 | * | 3/2008 | Hose | 455/411 |
| 2010/0004019 A1 | * | 1/2010 | Di Caprio et al. | 455/552.1 |
| 2010/0291898 A1 | * | 11/2010 | Sanding et al. | 455/411 |
| 2010/0311468 A1 | * | 12/2010 | Shi et al. | 455/558 |
| 2011/0086611 A1 | * | 4/2011 | Klein et al. | 455/407 |

OTHER PUBLICATIONS

Chinavasion Wholesale Ltd., "About Dual SIM Cell Phones," Created on Nov. 26, 2008. http://support.chinavasion.com/index.php?_m=knowledgebase&_a=viewarticle&barticleid=228.

* cited by examiner

*Primary Examiner* — Dustin Nguyen

(57) ABSTRACT

Methods and systems are provided for authorizing, managing, and brokering services for and between a plurality of service providers. A provisionable-services clearinghouse maintains in data storage a plurality of records that each identify (i) a respective mobile device, (ii) one or more types of service for which the respective mobile device can be provisioned, and (iii) a respective provider of each of the so-identified types of service for which the respective mobile device is currently provisioned. Subsequent provisioning requests identifying (i) a particular mobile device that itself is identified by a particular record from among the plurality of records, (ii) a first type of service, and (iii) a particular provider, and compared against the records in order to determine whether the requested provisioning can, or should be, authorized and/or recorded. Other information, such as contract terms, geographic limitations, etc., could also be included in the request and/or record.

22 Claims, 6 Drawing Sheets

PROVISIONABLE-SERVICES CLEARINGHOUSE FOR AUTHORIZING AND TRACKING A MOBILE DEVICE'S ACCESS TO MULTIPLE TYPES OF SERVICES AND MULTIPLE SERVICE PROVIDERS

BACKGROUND

1. Cellular Wireless Networks

Many people use mobile devices (MDs), such as cell phones and personal digital assistants (PDAs), to communicate with cellular radio access networks (RANs). A traditional RAN includes one or more mobile switching centers (MSCs), each of which is connected with one or more base station controllers (BSCs), and each BSC is in turn connected with one or more base transceiver stations (BTSs) that define cellular wireless coverage areas in which MDs can operate.

Service providers that operate these RANs typically distribute MDs to their subscribers, perhaps by selling the MDs at retail outlets or over the Internet, or perhaps by offering MDs at no cost to people that subscribe to a particular service plan. In some instances, subscribers may obtain their MDs elsewhere, and contact the service provider with sufficient information so that the service provider can provide the MD with service. Service providers then typically assign each MD one or more unique identifiers, among which may be an IP address and/or a telephone directory number (often known as a mobile identification number (MIN) or mobile directory number (MDN)), under which an MD may operate. Via a manual or over-the-air provisioning process, the service provider will cause the MD to store its IP address and/or MIN in its Number Assignment Module (NAM), and/or some other internal storage module and/or location.

Furthermore, each MD is typically provided at the time of manufacture with one or more unique hardware identifiers—among which may be an electronic serial number (ESN), Mobile Equipment Identifier (MEID) and/or International Mobile Equipment Identity (IMEI) number—to identify the MD as a unique physical device. After service is provisioned by a particular service provider, each MD may also have a service profile stored in a home location register (HLR) in the service provider's RAN, associated with one or more of the MIN, MDN, IMEI, and/or ESN, and each MSC in the RAN is typically in turn coupled directly or indirectly with the HLR.

The MDs and RANs typically communicate with each other over a radio-frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When an MD is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket large geographic areas with coverage; as such, they are referred to generally and may be herein as "macro (or macro-network) base stations" and the network they collectively form—or to which they collectively belong—is referred to generally and may be herein as the "macro network."

MDs and macro base stations conduct communication sessions (e.g., voice calls and data sessions) over frequencies known as carriers, each of which may actually be a pair of frequencies, with the base station transmitting to the MD on one of the frequencies, and the MD transmitting to the base station on the other. This is known as frequency division duplex (FDD). The base-station-to-MD link is known as the forward link, while the MD-to-base-station link is known as the reverse link.

When an MD powers on in, or otherwise enters, a coverage area (such as an area served by a particular RAN), the MD will register with the RAN, so the system can know where the MD is located (e.g., for purposes of directing calls to the MD) and so the RAN can verify that the MD is authorized to engage in wireless communications. In a typical radio network registration process, the MD sends a radio-access-registration message over the air to the RAN and, in cases of successful registration, then receives a radio-access-registration response message from the RAN. Further, during a typical radio-network-registration process, the HLR will deliver a copy of the MD's service profile to the serving MSC, so that the MSC can then reference the profile when serving the MD.

Once the MD is registered with the RAN, the MD can then place and receive voice calls (assuming the MD's service profile and configuration allow it), send text messages, and transmit packet-data communications, among other possibilities. To place a call, for instance, the MD may send a call-origination message over the air (e.g., over an air-interface access channel) to the RAN, providing a set of dialed digits indicative of a called-party phone number. Upon receipt of the call-origination message, the MSC may then direct the BSC to assign an air-interface traffic channel for use by the MD, and the MSC may further engage in call-setup signaling (e.g., ISDN User Part (ISUP) signaling) to set up the call with a remote switch serving the called party. When the called party answers, the MSC may then connect the call through to the MD. Similarly, when the MSC receives a request to connect an incoming call to the MD, the MSC may page and alert the MD over the air (e.g., over an air-interface paging channel). When the MD answers the call, the MSC may then connect the call through to the MD.

In another example, an MD compliant with the well known CDMA2000® protocol, for instance, may obtain packet-data connectivity by signaling with the RAN, and by signaling via the RAN with a packet-data serving node (PDSN) that sits as a gateway on a packet-switched network. In particular, after the MD enters a wireless-coverage area and successfully engages in radio-network registration, the MD can send a packet-data origination message via an air-interface access channel to the RAN. Under CDMA2000®, the packet-data origination message may be largely the same as a traditional call-origination message, except that it would include a special service option code that signifies a request to establish packet-data connectivity.

Upon receipt of the packet-data origination message, a BSC in the RAN may then assign an air-interface traffic channel for use by the MD as a radio link, and the RAN may signal to a PDSN to trigger establishment of a data link, such as a point-to-point-protocol session (i.e., a serialized packet-data connection), between the PDSN and the MD. Once that data link is established, the MD may then send a mobile-IP registration request to the PDSN, which the PDSN may forward to a mobile-IP home agent, which may then assign an IP address for use by the MD to engage in communications on the packet-switched network.

OVERVIEW

While there are a number of services that each service provider may provide (via a RAN) to a subscriber, including the above-mentioned voice, SMS-messaging, and packet-data services, a subscriber is typically required—with respect to a given mobile device—to choose a same single service provider for each one of these services.

With the proliferation of service providers, services provided by each of these service providers, and variations in the quality of service provided by each of these service providers, it would be advantageous if a subscriber could pick and choose—with respect to a single given mobile device—services from amongst the plurality of service providers. However, at this time, there is no centralized mechanism for facilitating such flexibility by, among other functions, authorizing and/or tracking services to which a subscriber currently subscribes. Rather, and at present, a given subscriber must handle all of the administrative duties involved with initially subscribing to a service provider, must receive all services desired for a particular MD from a single service provider, and must also handle any and all of the administrative duties involved in transferring service—and in fact each and every type of service for a given mobile device—from one service provider to another.

It would be advantageous if, instead, a subscriber could pick and choose those services to which a user wishes to subscribe, and for each particular type of service, pick and choose the service provider from which the subscriber wishes to receive the particular service. For example, particular types of service may include a data service, a voice service, an instant-messaging service, an audio-streaming service, and a video-streaming service, perhaps among a few or many other options as well. Furthermore, a subscriber may wish to subscribe to a data service of a service provider A, a voice service of a service provider B, and an instant-messaging service of a service provider C. And other examples are clearly possible as well.

Disclosed herein are methods and systems for providing a centralized provisionable-services clearinghouse that, among other functions, tracks what services, and with what service providers, an MD user is currently subscribed, and authorizes additional services and service providers.

In accordance with at least one embodiment, a provisionable-services clearinghouse maintains in a data storage a plurality of records that each identify (i) a respective MD, (ii) one or more types of service for which the respective MD can be provisioned, and (iii) a respective provider of each of the so-identified types of service for which the respective MD is currently provisioned. The records may be initially created, for example, after receiving an identifier uniquely identifying the MD from one or more of the manufacturer of the MD, a service provider desiring to provide service to the MD, and a user wishing to obtain service from the MD. A given record may initially be empty, perhaps other than the MD identifier, or may be populated with default fields, among other possibilities. The MD may be identified, for example, by one or more of an electronic serial number (ESN), an International Mobile Equipment Identity (IMEI), and a Mobile Equipment Identifiers (MEID).

The provisionable-services clearinghouse may receive a first provisioning request that identifies (i) a particular MD that itself is identified by a particular record from among the plurality of records, (ii) a first type of service, and (iii) a particular provider. The provisionable-services clearinghouse may then access the particular record associated with the particular MD identified in the first provisioning request, perhaps using an MD identifier included in the first provisioning request as an index into the plurality of records, and make a determination based on the contents of the particular record as to whether the first type of service is currently provisioned for the particular MD. In other embodiments, a particular record associated with a given mobile device may not be created until such a provisioning request is received, and may then be created in response to receipt of such a request, perhaps along with one or more other prerequisites.

If the determination is that the first type of service is not currently provisioned for the particular MD, the clearinghouse may then responsively carry out (i) sending to the particular provider a second provisioning request that requests that the first type of service be provisioned for the particular MD and (ii) updating the particular record to reflect that the particular MD is (now) currently provisioned to be provided the first type of service by the particular provider.

Alternatively, if the determination is that the first type of service is currently provisioned for the particular MD, then the provisionable-services clearinghouse may responsively transmit an error indication to one or both of the particular MD and the particular provider, the error indication indicating that the first type of service is currently provisioned for the particular MD.

Other information may also be tracked by the provisionable-services clearinghouse and/or included in the first provisioning request. For example, a particular contract duration and/or an early-termination fee for each type of service may also be included in each record. This information could then be provided to one or more of a service provider, a subscriber, or other third party in response to an inquiry or provisioning request. Furthermore, a particular geographic region in which the first type of service is provided—or is to be provided, or is requested, or is available, etc.—may also be included in each record.

By tracking geographic service limitations, the provisionable-services clearinghouse may allow a particular MD to receive a same type of service from different service providers, as long as they do not overlap in service areas. Service areas may be defined, for example, by region, state, country, or continent. In one embodiment, the MD may request and receive voice service from a first particular service provider in the United States, and voice service from a second particular service provider in Mexico. And may other examples are clearly possible as well.

BRIEF DESCRIPTION OF THE DRAWINGS

Various exemplary embodiments are described herein with reference to the following drawings, wherein like numerals denote like entities.

DETAILED DESCRIPTION

Figure 1:
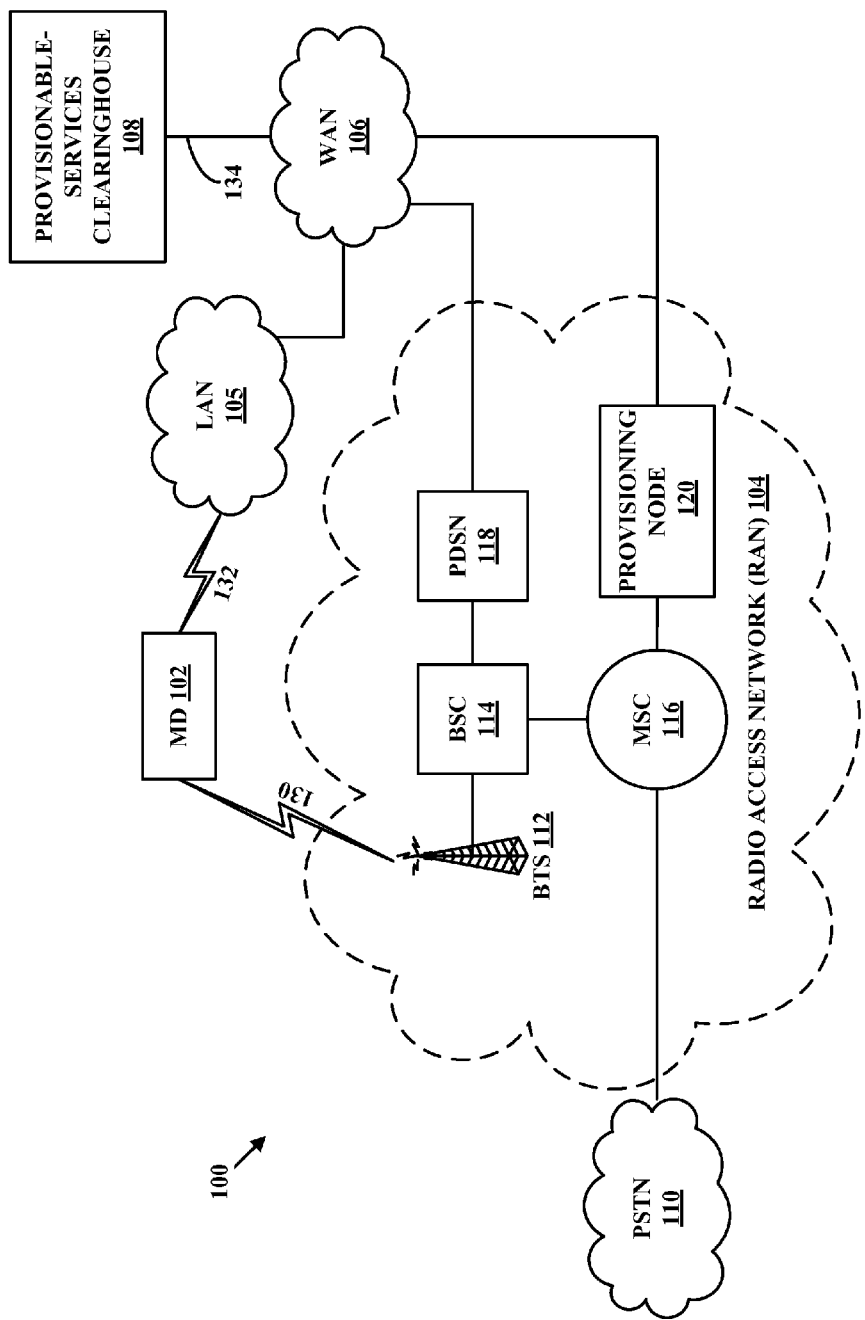
FIG. 1 is a simplified block diagram of a communication system, in accordance with exemplary embodiments.

I. An Example Structure of a Communication System that Includes a Radio Access Network Referring to the drawings, FIG. 1 is a simplified block diagram depicting an arrangement of an example of a communication system 100 in which at least one embodiment can be implemented. It should be understood, however, that these and other arrangements and processes shown and described herein are provided as examples only, and that many variations are possible. For instance, elements can be combined, distributed, omitted, added, or re-ordered. Further, the various logic functions described herein can be carried out by any combination of hardware, firmware and/or software, such as by one or more suitably programmed processors (e.g., one or more processors, data storage, and program instructions stored in the data storage and executable by the processor(s)), for instance.

As shown in FIG. 1, communication system 100 may include a mobile device (MD) 102, a RAN 104, a local-area network (LAN) 105, a wide-area network (WAN) 106, a provisionable-services clearinghouse 108, and a public-switched telephone network (PSTN) 110. The RAN 110 may further comprise a base transceiver station (BTS) 112, a base station controller (BSC) 114, a mobile switching center (MSC) 116, a packet data serving node (PDSN) 118, and a provisioning node 120. It should be understood that any number of network entities not shown in FIG. 1 could be present as well. As examples, there could be any number of MDs and other devices in communication with provisionable-services clearinghouse 108, PSTN 110, BTS 112, MSC 116, PDSN 118, and/or provisioning node 120. Furthermore, there could be any number of intermediate devices and/or networks making up all or part of any of the communication links between the entities of FIG. 1. For example, there could be one or more switches, routers, or other devices on the communication link between PDSN 118 or provisioning node 120 and the WAN 106.

MD 102 may be any mobile device capable of communicating with one or more base stations, one or more other mobile devices, and/or other wireless network devices. MD 102 may comprise one or more antennas that radiate to communicate with one or more other wireless network devices or RANs. As examples, MD 102 may communicate with base stations over a radio-frequency (RF) air interface 130 using a protocol such as CDMA (or, e.g., Global System for Mobile Communications (GSM), Time Division Multiple Access (TDMA), WiMax, and/or any others) and/or with wireless routers or access points over an RF air interface 132 using a protocol such as IEEE 802.11 (or, e.g., Bluetooth, WiMAX, ZigBee, and/or any others). MD 102 may further comprise a processor and data storage comprising program instructions executable by the processor for carrying out the MD functions described herein. As examples, the MD 102 may be a cell phone, PDA, or laptop computer. The MD 102 will be described in more detail in a later section and with reference to FIG. 4.

BTS 112 may be any base transceiver station capable of communicating over an RF air interface with multiple MDs using a protocol such as CDMA, or some other air-interface protocol. BTS 112 may comprise one or more antennas that radiate to define respective coverage areas. BTS 112 may further comprise a communication interface for communicating with a BSC 114, as well as a processor and data storage comprising program instructions executable by the processor for carrying out the BTS functions described herein. BTS 112 may be communicatively coupled with BSC 114, and in turn with PDSN 118 and MSC 116.

BSC 114 may be any base station controller capable of communicating with one or more BTSs, as well as with one or more PDSNs, and one or more MSCs. BSC 114 may be communicatively coupled with at least BTS 112, PDSN 118, and MSC 116. BSC 114 may comprise a communication interface for communicating with the aforementioned devices, as well as a processor and data storage comprising program instructions executable by the processor for carrying out the BSC functions described herein.

Note that the term "base station" as used herein may refer to a particular BTS such as BTS 112. However, "base station" may also refer to a combination of a BTS and a BSC, such as the combination of BTS 112 and BSC 114. Furthermore, the arrangement of the BTS and BSC in FIG. 1 is exemplary in nature and is not meant to convey geographic relation. It should also be noted that more than one BTS could be controlled by a single BSC. Also, a given PDSN or MSC could communicate with more than one BSC. And many other arrangements are possible as well.

PDSN 118 may be any networking device having a communication interface for communicating with BSC 114 and WAN 106, and may comprise a processor and data storage comprising program instructions executable by the processor for carrying out the PDSN functions described herein. PDSN 118 may function to provide packet-data connectivity between BSC 114 and WAN 106. PDSN 118 may include network-access-server functionality that enables MDs, such as MD 102, to send packet data to and receive packet data from WAN 106. As one example, PDSN 118 may be equipped to enable packet-based communication sessions between MD 102 and WAN 106.

MSC 116 may be any networking device having a communication interface for communicating with BSC 114 and PSTN 110, and may comprise a processor and data storage comprising program instructions executable by the processor for carrying out the MSC functions described herein. MSC 116 may function as a switching element, providing MDs, such as MD 102, with the ability to place and receive calls over PSTN 110 and place and receive calls with other MDs being serviced by the same or different BTS. As an example, MSC 116 may function to enable voice calls between MD 102 and PSTN 110. MSC 116 may also function to transmit page messages to MDs, such as MD 102, when an incoming call requests a connection with the MD 102. MSC 116 may also function to maintain a service profile associated with each MD, such as MD 102, in a home location register (HLR) in the RAN, and in cooperation with provisioning node 120, may be involved in the provisioning process of provisioning new service for an MD such as MD 102. In at least one embodiment, the HLR may be—or may be included in—a separate device within the RAN that is accessible to the MSC 116.

LAN 105 may be communicatively coupled with WAN 106, as well as one or more MDs, such as MD 102, via RF air interface 132. LAN 105 may include one or more local area networks and/or one or more private networks, each of which may comprise wired and/or wireless networks. Devices in communication with LAN 105 may exchange data using a packet-switched protocol such as the Internet Protocol (IP), and may be identified by an address such as an IP address.

WAN 106 may be communicatively coupled with PDSN 118, as well as with one or more additional network entities, such as LAN 105 and provisioning node 120, and may include one or more wide area networks, one or more local area networks, one or more public networks such as the Internet, and/or one or more private networks, each of which may comprise wired and/or wireless networks. Devices in communication with WAN 106 may exchange data using a packet-switched protocol such as the Internet Protocol (IP), and may be identified by an address such as an IP address. With this arrangement, an MD 102 may be arranged to communicate with provisionable-services clearinghouse 108 through (i) a communication path comprising air interface 130, BTS 112, BSC 114, PDSN 118, and WAN 106 and/or (ii) LAN 105 and WAN 106, among other possibilities.

Figure 5:
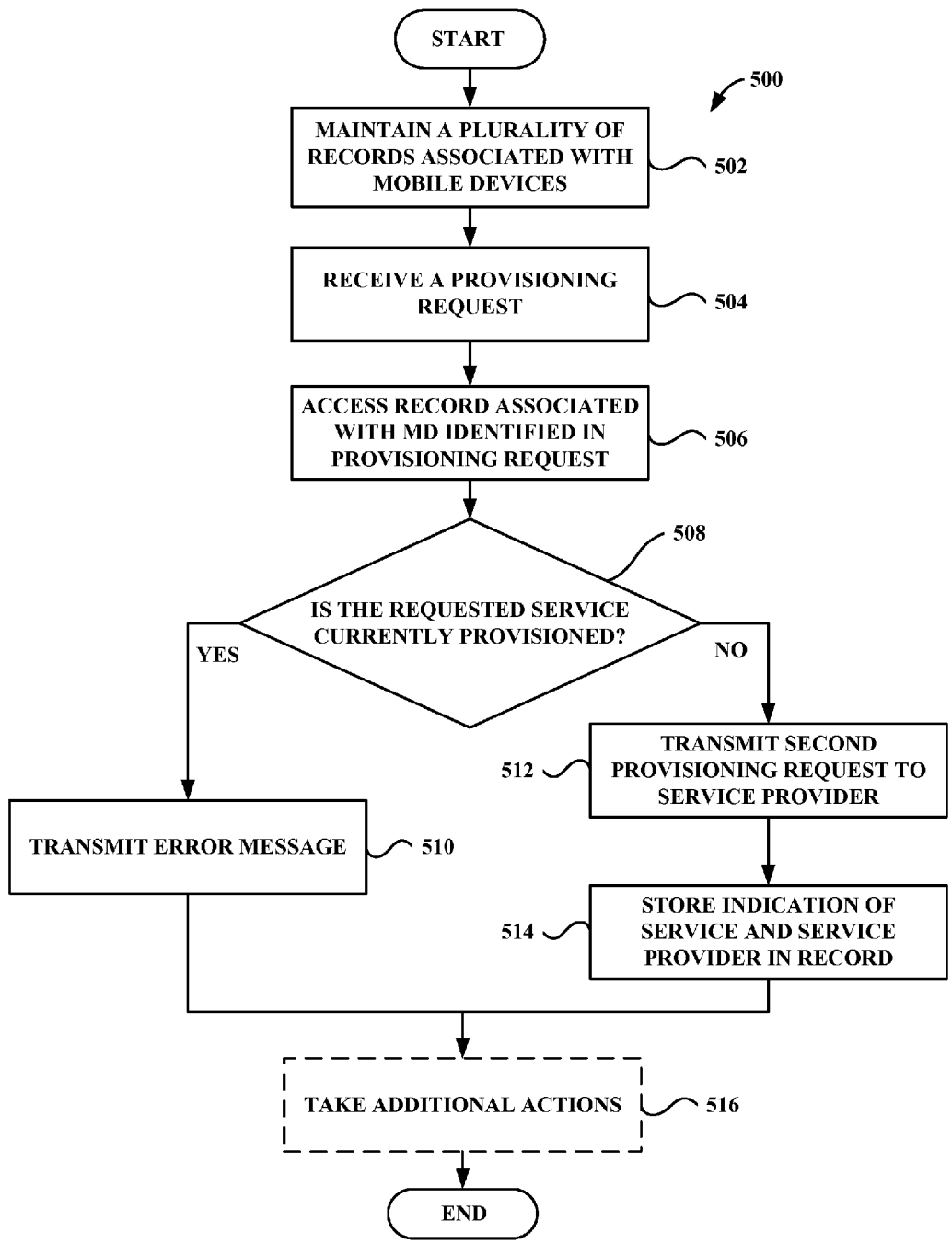
FIG. 5 is a flowchart of a method implemented by a provisionable-services clearinghouse in accordance with exemplary embodiments.

Provisionable-services clearinghouse 108 may be communicatively coupled with WAN 106, via connection 134, and may be configured to authorize and track services and service providers for each of a plurality of MDs, such as MD 102. In one or more embodiments, provisionable-services clearinghouse 108 may, for each MD it tracks, maintain a mapping that associates an MD identifier with one or more services (and service providers) to which the respective MD is subscribed. Provisionable-services clearinghouse 108 may provide service-provisioning services to RANs, such as RAN 104, via a communicative coupling with a provisioning node 120 within the RAN 104. Additionally, provisionable-services clearinghouse 108 may provide information regarding services currently subscribed to, and an ability to obtain additional services, directly to MDs, such as MD 102, via the WAN 106 and/or some other route. Furthermore, provisionable-services clearinghouse 108 may carry out one or more functions described herein, such as but certainly not limited to corresponding portions of the later-described method 500, which is depicted in FIG. 5.

PSTN 110 may be communicatively coupled with at least MSC 116. With this arrangement, an MD 102 may communicate in a voice call with a remote telephone device through a communication path comprising air interface 130, BTS 112, BSC 114, MSC 116 and PSTN 110.

Figure 2:
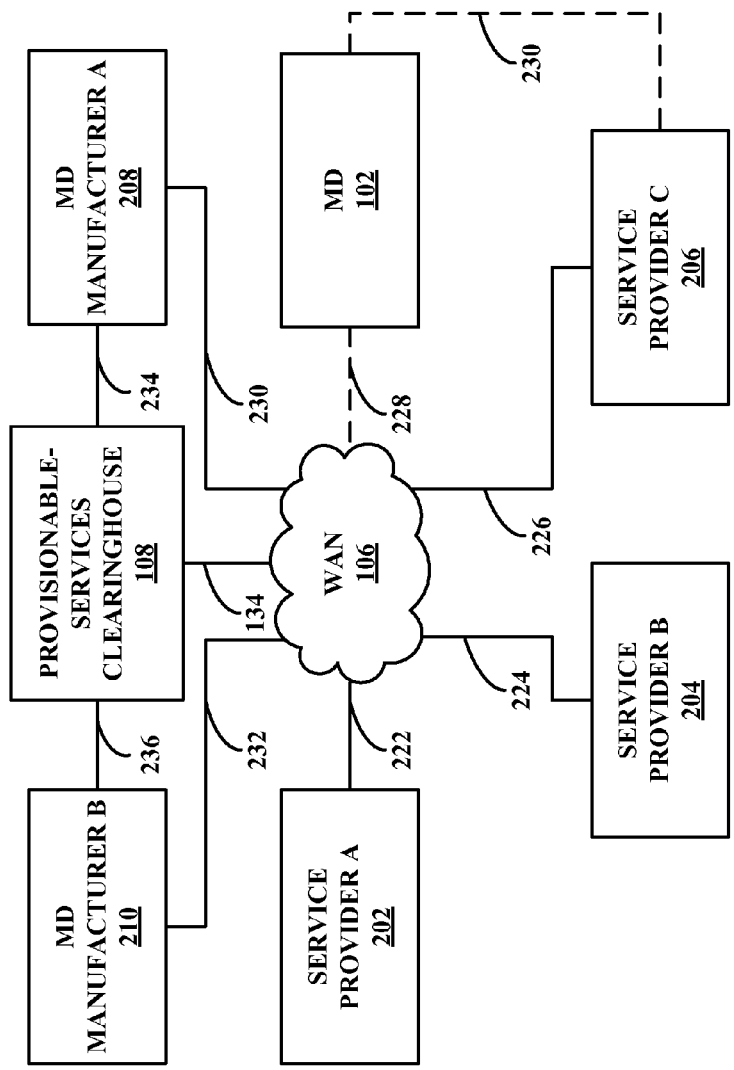
FIG. 2 is another simplified block diagram of a communication system, in accordance with exemplary embodiments.

FIG. 2 sets forth a simplified block diagram depicting a coupling of the provisionable-services clearinghouse 108 with each of a plurality of service providers, including service provider A 202, service provider B 204, and service provider C 206, and with each of a plurality of MD manufacturers, including MD manufacturer A 208 and MD manufacturer B 210. Each of the service providers A-C 202-206 may include a RAN similar to, or different from, the RAN 104 set forth in FIG. 1. For example, MD 102 may be coupled to provisionable-services clearinghouse 108 via a BTS, BSC, and PDSN in service provider C 206 via RF interface 230. The MD 102 may, in addition to or in place of the coupling through service provider C 206, also be coupled to provisionable-services clearinghouse 108 via a direct connection 228 with WAN 106. In some embodiments, MD 102 may also have access to provisionable-services clearinghouse 108 via any one or more other service provider networks, such as through service provider A 202 and/or service provider B 204, perhaps using same or different protocols or services. Each of service providers A-C 202-206 are coupled to provisionable-services clearinghouse 108 via respective connections 222-226, WAN 106, and connection 134. Other routes and network configurations are possible as well.

Each of MD manufacturers A 208 and B 210 may be manufacturers of one or more MDs operable to receive services from one or more of service providers A-C 202-206. Each of the MD manufacturers A 208 and B 210 may have a direct connection with provisionable-services clearinghouse 108 via connections 234 and 236, respectively, may have an indirection connection with provisionable-services clearinghouse 108 via connections 230 and 232, WAN 106, and connection 134, and/or some other route. MD manufacturers A 208 and B 210 may be configured to provide to provisionable-services clearinghouse 108 MD identifiers, among other information, associated with MDs manufactured at a respective manufacturing location. These MD identifiers may then be used by provisionable-services clearinghouse 108 in authorizing and/or tracking services subsequently subscribed to by purchasers of the MDs manufactured by the MD manufacturers and sold, perhaps, at general retail locations, by the service providers themselves, and/or according to one or more other arrangements.

In the network structure of FIG. 2, provisionable-services clearinghouse 108 may act as a services-authorization-and-tracking clearinghouse for one or more of service providers A-C 202-206, may function to provide a gateway for an MD such as MD 102 to sign up for initial service, may function to prevent an MD such as MD 102 from obtaining what would be a duplicative, conflicting service from multiple service providers (perhaps also taking into consideration geographic and/or temporal limitations of service and/or other considerations), and may function to broker transfer of services from one service provider to another, among other possibilities. Other functions are possible as well. Provisionable-services clearinghouse 108 may also carry out one or more functions described herein, such as but certainly not limited to corresponding portions of the later-described method 500, which is depicted in FIG. 5.

a. Exemplary Provisionable-Services Clearinghouse

Figure 3:
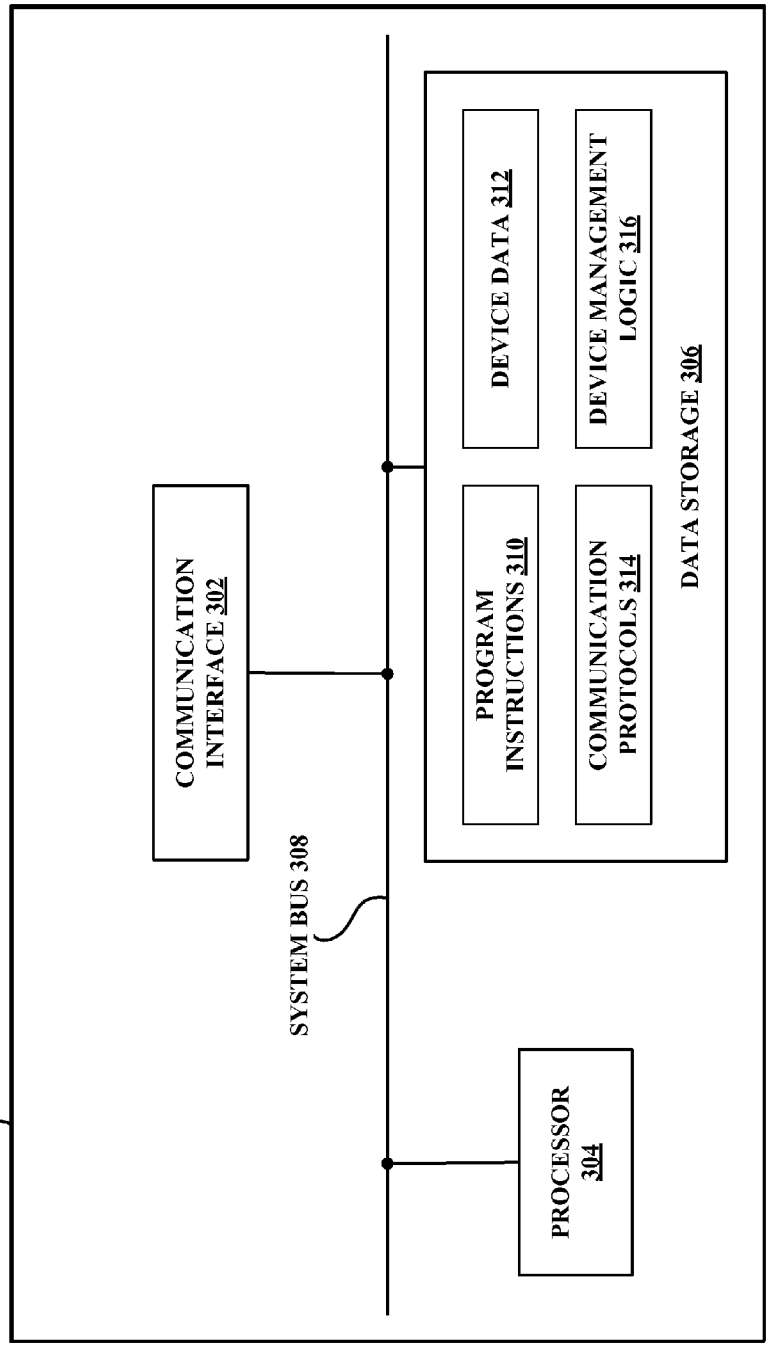
FIG. 3 is a simplified block diagram of a provisionable-services clearinghouse, in accordance with exemplary embodiments.

FIG. 3 is a functional block diagram depicting a provisionable-services clearinghouse 108, arranged to carry out one or more embodiments, which could reside as (or as part of) a separate entity outside of a RAN 104, as illustrated in FIG. 1, or may reside as (or as part of) a device within a particular RAN, such as RAN 104. In the latter case, the functions associated with the provisionable-services clearinghouse 108 may in fact be carried out by a RAN device such as BSC 114, MSC 116, provisioning node 120, etc. For ease of reference, FIG. 3 illustrates an embodiment in which provisionable-services clearinghouse 108 is a device separate from any service provider network, consistent with the network structures set forth in FIGS. 1 and 2, though again this is for clarity of presentation and not by way of limitation.

FIG. 3 illustrates that a provisionable-services clearinghouse 108 may include a communication interface 302, a processor 304, and data storage 306, all of which may be communicatively linked by a system bus 308.

Communication interface 302 may be a combination of hardware and software enabling provisionable-services clearinghouse 108 to communicate with MD manufacturers A 208 and B 210, WAN 106, MD 102, service providers A-C 202-206, and/or possibly one or more other entities. As such, communication interface 302 may include an interface for packet-switched communication and another for circuit-switched communication. Communication interface 302 may include an Ethernet card and may, instead or in addition, include a wireless-communication interface, which may enable it to communicate wirelessly with one or more devices or networks.

Processor 304 may comprise multiple (e.g., parallel) processors, such as a general purpose microprocessor and/or a discrete digital signal processor. Data storage 306 may take various forms, in one or more parts, such as a non-volatile storage block and/or a removable storage medium.

Data storage 306 may store program instructions 310, device data 312, communication protocols 314, and device management logic 316. Program instructions 310 may be executable by processor 304 to carry out various functions described herein. Device data 312 may include any type of data related to those functions and may include, for example, a plurality of records associated with one or more MDs, each record perhaps including MD identifiers associated with corresponding MDs that the provisionable-services clearinghouse 108 has been tasked with authorizing and/or tracking, one or more services to which each MD is subscribed, and/or one or more service providers that provide the one or more subscribed services, among other possibilities.

Communication protocols 314 may be useful to receive data from and send data to one or more network entities, and may include any suitable protocols. Device management logic 316 may be used to manage aspects of provisionable-services clearinghouse 108 such as memory and file access.

b. Exemplary MD

Figure 4:
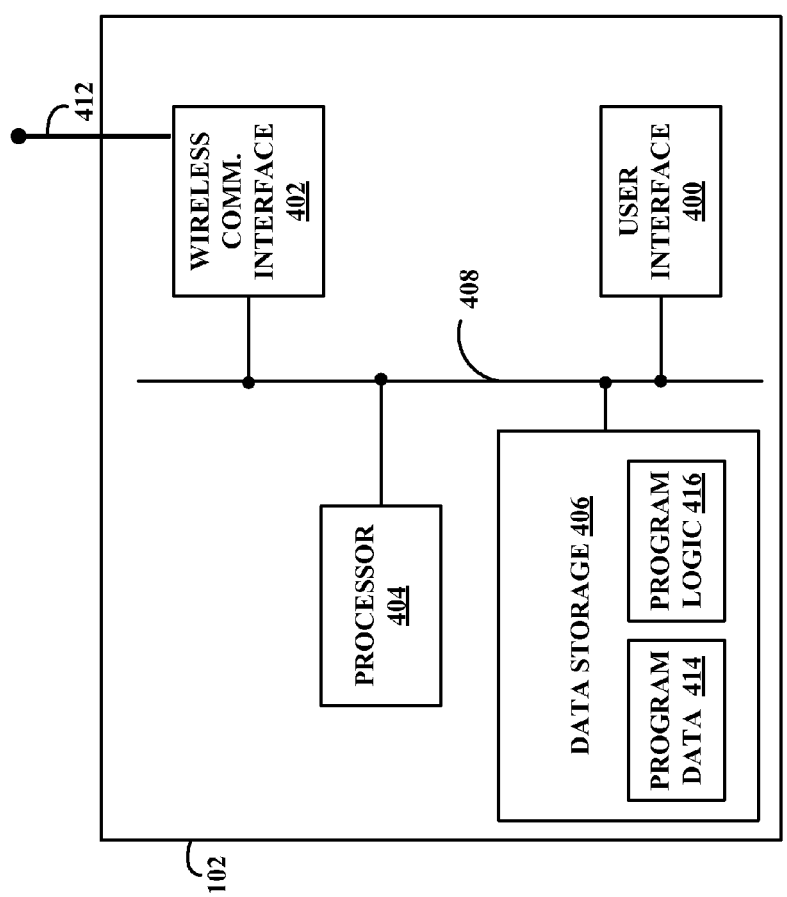
FIG. 4 is a simplified block diagram of a mobile device, in accordance with exemplary embodiments.

FIG. 4 is a functional block diagram depicting an exemplary MD 102 arranged to carry out one or more embodiments.

As shown in FIG. 4, MD 102 may include a user interface 400, a wireless-communication interface 402, a processor 404, and data storage 406, all linked together via a system bus, network, or other connection mechanism 408. An internal or external antenna 412 may be provided to aid in wireless communications with other devices. The MD 102 may of course also include other elements.

The user interface 400 facilitates user interaction with the exemplary MD 102, and may include a variety of input components, such as a touchscreen, a navigation pad, a multi-functional button, a thumb wheel, a keyboard or keypad, and/or a microphone for instance. Additionally, the user interface 400 may include a variety of output components, such as a display and/or a speaker, as examples. The user interface 400 may include signal-processing components, such as analog-to-digital (A-D) and digital-to-analog (D-A) circuitry, and perhaps other components for facilitating user interaction with the exemplary MD 102.

The communication interface 402 may function to communicatively couple the MD 102 to one or more of a RAN such as RAN 104 (e.g., more particularly, to the BTS 112) and the LAN 105. With respect to the RAN 104, the communication interface 402 may facilitate forward-link and reverse-link communication with the BTS 112. With respect to the LAN 105, the communication interface 402 may facilitate one or more local-area wireless-protocol (such as, e.g., IEEE 802.11) connections with one or more wireless routers and/or access points contained within the LAN 105.

The communication interface 402 may include a chipset adapted to facilitate wireless communication according to a desired protocol (e.g., CDMA, EV-DO, WiMax, IEEE 802.11, Bluetooth, etc.) and/or any other hardware, software, and/or firmware that facilitates wireless communication. The communication interface 402 may also include multiple communication interfaces, such as one with which MD 102 sends reverse-link communications, one with which MD 102 receives forward-link communications, and one over which MD 102 conducts local-area wireless communications. Other configurations are also possible.

The processor 404 may comprise one or more general-purpose microprocessors and/or dedicated signal processors. (The term "processor" encompasses either a single processor or multiple processors that could work in combination.) Data storage 406, in turn, may comprise any computer readable medium, including memory and/or other storage components, such as optical, magnetic, organic or other memory or disk/disc storage, which can be volatile and/or non-volatile, internal and/or external, and integrated in whole or in part with the processor 404.

Data storage 406 preferably contains or is arranged to contain (i) program data 414 and (ii) program logic 416. Although these components are described herein as separate data-storage elements, they could just as well be physically integrated together or distributed in various other ways. In one example, the program data 414 may be maintained in data storage 406 separate from the program logic 416, for easy updating and reference by the program logic 416. Additionally, the data storage 406, including any portion of program data 414 and/or program logic 416, may be stored in a removable computer readable medium that is detachable from the MD 102 and/or bus 408.

Program data 414 may contain, for example, information related to the types of services to which the MD 102 is subscribed, associated service providers for providing each type of service, and information identifying a communication interface of wireless-communications interface 402 with which to obtain the subscribed service. As another example, program data 414 may contain an identifier such as an electronic serial number (ESN) that uniquely identifies the MD 102, and which may be used in obtaining authorization for a new service type, or accessing a currently subscribed service, from one or more of the provisionable-services clearinghouse 108 and service providers A-C 202-206. This identifier could be a hardcoded value stored in static, non-volatile, read-only memory, or could be an updatable value that is modifiable by a manufacturer, user, and/or service provider.

Figure 6:
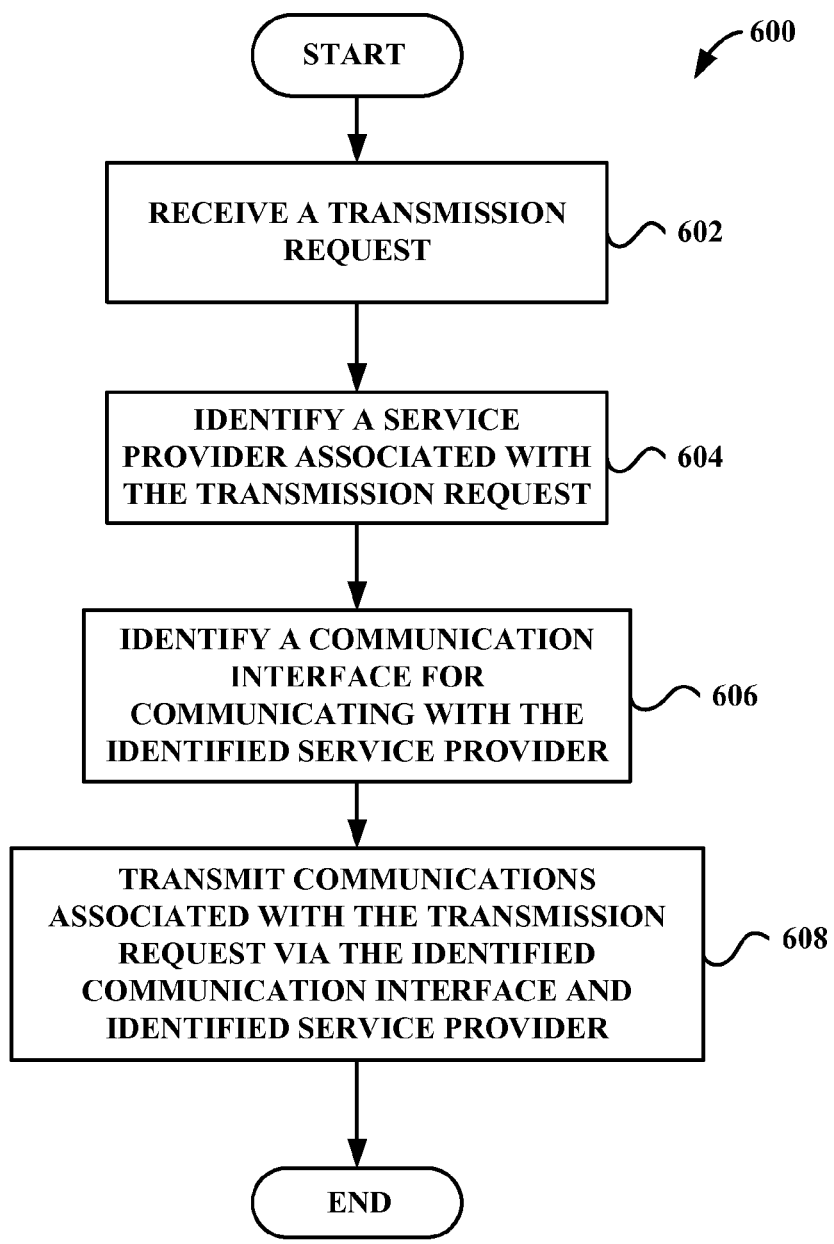
FIG. 6 is a flowchart of a method implemented by a mobile device, in accordance with exemplary embodiments.

Program logic 416 may comprise machine-language instructions that may be executed or interpreted by processor 404 to carry out functions in accordance with various embodiments, including for example, method 600 of FIG. 6. Additionally, program logic 416 may comprise machine-language instructions for initiating and managing data and voice communications with other devices, among other functions.

2. Exemplary Operation a. An Exemplary Provisionable-Services Clearinghouse Method and Apparatus FIG. 5 depicts a flowchart of a method in accordance with at least one embodiment. In particular, FIG. 5 depicts a method 500 for a provisionable-services clearinghouse 108 to authorize and/or track services and service providers for a plurality of MDs.

As shown in FIG. 5, method 500 begins at step 502, as provisionable-services clearinghouse 108 maintains a plurality of records associated with MDs. At step 504, the provisionable-services clearinghouse 108 receives a provisioning request from one of an MD or a first service provider requesting authorization to provide a first type of service, from the first service provider, to the MD. At step 506, the provisionable-services clearinghouse 108 accesses a particular record associated with the MD identified in the provisioning request.

At step 508, the provisionable-services clearinghouse 108 determines if the type of service requested at step 504 is currently provisioned for the identified MD. If so, processing proceeds to step 510 where the provisionable-services clearinghouse 108 transmits an error message. On the other hand, if not, processing proceeds to step 512 where the provisionable-services clearinghouse 108 transmits a second provisioning request to the first service provider, and stores an indication of the first type of service and first service provider (that were set forth in the request) in the particular record associated with the identified MD.

These steps are further described below.

i. Maintain a Plurality of Records Associated with MD Identifiers

At step 502, provisionable-services clearinghouse 108 maintains a plurality of records respectively associated with MDs. Each record may associate, for example, a particular MD identifier with one or more potential services that the MD could access. Each record maintained by the provisionable-services clearinghouse 108 may include a same number and type of services, or may differ from one another, perhaps based on capabilities of the style or model of MD with which the MD identifier is associated, and/or perhaps based on one or more other considerations. For example, a record associated with a fully-featured MD with sufficient processing capabilities may include video-streaming and/or audio-streaming service options in the record, while a record associated with a "budget" MD without such capabilities may not include video-streaming and/or audio-streaming service options in the record. Other differences may exist as well, perhaps related to voice, data, text messaging, or other capabilities.

Records maintained by provisionable-services clearinghouse 108 may be first created in response to receipt of one or more MD identifiers from one or more MD manufacturers, one or more service providers, one or more consumers, etc. In an example arrangement, and as previously illustrated in FIG. 2, one or more MD manufacturers A-B 208-210 may be in direct or indirect communication with provisionable-services clearinghouse 108, and may provide provisionable-services clearinghouse 108 with one or more MD identifiers associated with MDs it has manufactured. In at least one embodiment, MD 102 may provide its own MD identifier to provisionable-services clearinghouse 108 via WAN 106 and/or one of service providers A-C 202-206. In one example, service provider C 206 may be configured to allow all MDs 102, even those not currently subscribed to services of service provider C, to communicate with provisionable-services clearinghouse 108 via its network (perhaps by looking at a destination phone number or IP address of communications generated by MD 102).

Upon receipt of an MD identifier from a manufacturer or some other entity, provisionable-services clearinghouse 108 may create a record associated with the received MD identifier, and initially set the services and/or service provider entries associated with that MD identifier to a blank, empty, or "NULL" value. Assuming the MD identifier provided to the provisionable-services clearinghouse 108 is accompanied by other information, such as a requested service type and/or service provider, this additional information may alternatively or additionally be used to populate an initial record associated with the provided MD identifier.

TABLE 1

Example Provisionable-Services Clearinghouse Record Structure

| MD Identifier | Service Type | Service Provider |
|---|---|---|
| 012345678901 | Voice | NULL |
|  | Data | NULL |
|  | Text Messaging | NULL |
| 345678901234 | NULL | NULL |
|  | NULL | NULL |
|  | NULL | NULL |

Table 1 sets forth an example record structure that provisionable-services clearinghouse 108 may create in response to receiving example MD identifiers 012345678901 and 345678901234 (perhaps in same or different communications from same or different MD manufacturers 208, 210, or perhaps from a service provider or directly from an MD itself). While the example record structure in Table 1 illustrates a table record format, other types of formats could also or alternatively be used, including for example, comma-separate values (CSV), linked lists, arrays, graphs, etc.

In one example, and as illustrated with respect to MD identifier 012345678901 in Table 1 above, the provisionable-services clearinghouse 108 may respond to receiving the MD identifier 012345678901 by creating a new record with default service types, such as Voice, Data, and Text Messaging, and by setting an associated service provider entry for each service to a blank, empty, or NULL value. In another example, and as illustrated with respect to MD identifier 345678901234, the provisionable-services clearinghouse 108 may respond to receiving the MD identifier 345678901234 by creating a new record with blank, empty, or NULL service types, and by setting an associated service provider entry for each black, empty, or NULL service to type to a similar blank, empty, or NULL value. And other possibilities exist as well.

In addition to tracking service types and service providers, the provisionable-services clearinghouse 108 may track additional (perhaps optional) information with respect to the MD identifiers. For example, the provisionable-services clearinghouse 108 may also store information identifying a contract duration for one or more service-type-and-service-provider combination, information identifying an early-termination fee for one or more service-type-and-service-provider combination, and/or information identifying whether a user associated with the MD identifier has opted-in (or, in some embodiments, opted out) of receiving advertising or promotional communications from past, current, and/or prospective service providers. Other types of information could be tracked as well.

While Table 1 shows two MDs and three service types associated with each MD, the disclosed systems and methods are equally applicable to any number of MDs and any number of service types for each MD. Furthermore, while the MD identifiers in Table 1 have been chosen to correspond to an ESN-format, other types of MD identifiers could additionally or alternatively be used, including for example, an MEID and/or an IMEI number.

ii. Receive a Provisioning Request

At step 504, the provisionable-services clearinghouse 108 receives a provisioning request from one of an MD, a first service provider, or some other entity requesting authorization to provide a first type of service from the first service provider to the MD. More specifically, the provisioning request may identify a type of service being requested (e.g., voice, data, text messaging, video streaming, audio streaming, etc.), the service provider from which the service will be provided, and/or one or more additional pieces of information (such as a contract duration, an early-termination fee, a geographic area associated with the service, etc.).

In cases where the provisioning request is transmitted from a service provider, such as service provider C 206, the request may be a result of a user associated with MD 102 contacting a sales representative of service provider C 206, and as a result of the user agreeing to a service contract with service provide C 206, the service provider C 206 generating and transmitting the provisioning request to the provisionable-services clearinghouse 108. In the case that the request is transmitted from MD 102, the request may have been preceded by a query from MD 102 to provisionable-services clearinghouse 108 requesting, perhaps based on a detected location of MD 102 or a location identifier entered by a user of MD 102, a list of available services and service providers to which the user of MD 102 may subscribe. In response to the query, provisionable-services clearinghouse 108 may have provided MD 102 with a list of services to which it may subscribe (perhaps, though not necessarily, after accessing a record and determining what services had not yet been provisioned to MD 102) and a list of service providers that could provide the listed services to MD 102. Other terms, such as cost, number of minutes, number of text messages, etc. could also have been provided.

After reviewing the information and receiving a selection indication from a user, MD 102 may transmit a provisioning request to provisionable-services clearinghouse 108, indicating one or more services for which the mobile device may be provisioned, along with one or more associated service providers (and perhaps also including one or more potentially-relevant service parameters such as cost, contract duration, early-termination fee, etc.).

Other methods and means for generating the provisioning request, involving MD 102, the user of MD 102, a service provider, a manufacturer, and/or some other third party could be used as well.

iii. Access Record Associated with Provisioning Request

At step 506, the provisionable-services clearinghouse 108 accesses a particular record, from among the plurality of records being maintained, associated with the MD identified in the provisioning request. The plurality of records may be stored locally at the provisionable-services clearinghouse 108, and may be retrievable from a device data 312 portion of data storage 306 via system bus 308. In one embodiment, the records may additionally or alternatively be stored remotely to the provisionable-services clearinghouse 108, and may be retrievable via the communication interface 302 and one or more wired and/or wireless network connections.

After retrieving the record, the processor 304 in provisionable-services clearinghouse 108 may, if necessary, parse the record to obtain information necessary to determine, in the next step, whether the requested service is currently provisioned to the MD 102. For example, in the case of a comma-separated-value (CSV) record structure, the processor 304 may be configured to parse the elements in the CSV record structure to identify contents of the record associated with services that have or have not already been provisioned, and for those that have been provisioned, service providers and/or other information associated with the provisioned services. Other possibilities exist as well.

iv. Determine Whether the Requested Service is Currently Provisioned

At step 508, the provisionable-services clearinghouse 108 determines whether the type of service requested at step 504 is currently provisioned for the identified MD. This determination process may involve determining whether the retrieved record already includes an entry identifying the requested service, whether the entry has a valid value (or, e.g., has a blank, empty, or NULL value), and/or whether the record includes an entry identifying a valid service provider with respect to the requested service.

If provisionable-services clearinghouse 108 determines that the requested service has already been provisioned for the MD 102 identified in the request, processing proceeds to step 510. If, on the other hand, provisionable-services clearinghouse 108 determines that the requested service has not already been provisioned for the MD 102 identified in the request, processing proceeds to step 512.

TABLE 2

Example Updated Provisionable-Services Clearinghouse Record Structure

| MD Identifier | Service Type | Service Provider |
|---|---|---|
| 012345678901 | Voice | ServiceProv2 |
|  | Data | NULL |
|  | Text Messaging | NULL |
| 345678901234 | NULL | NULL |
|  | NULL | NULL |
|  | NULL | NULL |

For example, given the first record set forth above in Table 2, if the provisioning request identifies the MD with the identifier 012345678901 and identifies the service type as voice, the provisionable-services clearinghouse 108 may determine that the requested type of service (voice) is currently provisioned for the associated MD, and proceed to step 510. On the other hand, if the provisioning request identifies the MD with the identifier 012345678901 and identifies the service type as data, the provisionable-services clearinghouse 108 may determine that the requested type of service (data) is not currently provisioned for that MD, and proceed to step 512. Other examples are possible as well.

v. If the Requested Service has Already been Provisioned, Transmit Error Message As stated, in the event that the provisionable-services clearinghouse 108 determines that the requested service is currently provisioned for the MD 102 identified in the request, processing proceeds from step 508 to step 510. At step 510, the provisionable-services clearinghouse 108 transmits an error message to the requesting entity (e.g., a service provider such as service provider C 206 or an MD such as MD 102), indicating that the requested service has already been provisioned for the MD 102 identified in the request.

In addition to the error message, provisionable-services clearinghouse 108 may also transmit information to the requesting entity indicating one or more of a remaining contract duration for the requested service, an identity of the current service provider providing the requested service to the MD 102, and/or an early-termination fee associated with canceling the requested service with the service provider that is currently providing it. The provisionable-services clearinghouse 108 may further provide the requesting entity with a mechanism to request cancellation of the requested service with the current service provider, a mechanism to request new service with the second service provider indicated in the provisioning request, and/or a mechanism to request that the provisionable-services clearinghouse 108 monitor the contract duration and provide an alert when the contract duration is about to, or has, expired. Other possibilities exist as well.

And one or more of such mechanisms may take the form of or include return message, URL to a website, phone number for the current service provider, and/or one or more other possibilities.

vi. If the Requested Service has not Already been Provisioned, Transmit Authorization Message and Store Indication in Record In the event that the provisionable-services clearinghouse 108 determined that the requested service is not currently provisioned for the MD 102 identified in the request, processing proceeds from step 508 to step 512. At step 512, the provisionable-services clearinghouse 108 transmits a second provisioning request to the respective service provider indicated in the request, authorizing and/or instructing that service provider to provision the requested service to the MD 102. In addition, provisionable-services clearinghouse 108 may transmit a provisioning-success message to the respective MD 102, perhaps via WAN 106 and/or a service provider.

The authorization message transmitted to the respective service provider indicated in the request may include information sufficient to provision the requested service to the MD 102. For example, the authorization message may include one or more identifiers associated with the MD 102, an indication of the type of service requested, and/or other information such as a contract duration, number of minutes, number of text messages, etc. The message may be transmitted to, for example, a provisioning node such as provisioning node 120 in RAN 104 of FIG. 1.

In response to receiving the authorization message, the respective service provider may proceed with provisioning service for the MD 102 identified by the authorization message. For example, given the network configuration in RAN 104 of FIG. 1, the service provider may receive the authorization message at provisioning node 120, which may then create a service profile associated with the MD identifier included in the authorization message, assign one or more of an MD telephone directory number (often known as a MIN or MDN) and a static or dynamic IP address to the MD identifier included in the authorization message, and transmit the service profile to the MSC 116 for further processing and/or storage in an HLR. The service profile may then be used by RAN 104 in authorizing the requested service in the RAN 104 (the home network) or some other network (a visitor network). Other possibilities exist as well.

At step 514, provisionable-services clearinghouse 108 may also update the record associated with the MD—identified in the provisioning request—to reflect the successful provisioning. For example, assuming the MD identifier included in the request had a value of 345678901234, the service type included in the request had a value of Data, and the service provider identified in the request had a value of ServiceProv1, the example record set forth in Table 1 above may be updated in the following manner:

TABLE 3

Example Updated Provisionable-Services Clearinghouse Record Structure

| MD Identifier | Service Type | Service Provider |
|---|---|---|
| 012345678901 | Voice | NULL |
| | Data | NULL |
| | Text Messaging | NULL |

TABLE 3-continued

Example Updated Provisionable-Services Clearinghouse Record Structure

| MD Identifier | Service Type | Service Provider |
|---|---|---|
| 345678901234 | Data | ServiceProv1 |
| | NULL | NULL |
| | NULL | NULL |

In this manner, subsequent requests to provisionable-services clearinghouse 108 including an MD identifier value of 345678901234, and including a service type of Data, may be denied authorization, and/or may be provided with additional information consistent with the disclosure set forth above with respect to step 510. Although the Data service type and ServiceProv1 service provider were recorded in the first line of the record associated with the MD identifier 345678901234, in an embodiment in which the second row is always associated with Data (e.g., consistent with the record in Table 3 associated with the MD identifier 012345678901), the information may be similarly recorded in the second row of the 345678901234 record. Other methods of indicating the successful assignment of the Data service type and the ServiceProv1 service provider to MD identifier 345678901234 are known in the art and could be used as well.

Furthermore, and assuming additional information was provided in the provisioning request, such as contract duration, early-termination fee, geographic service area, etc., such information may additionally be stored in the 345678901234 record (although not illustrated in Table 3 above).

Carrying this example further, and assuming a user associated with MD identifier 345678901234 signed up with a difference service provider for each of a different type of service, the example record set forth in Table 3 above may cumulatively be updated so as to arrive at the following state:

TABLE 4

Another Example Updated Provisionable-Services Clearinghouse Record Structure

| MD Identifier | Service Type | Service Provider |
|---|---|---|
| 012345678901 | Voice | NULL |
| | Data | NULL |
| | Text Messaging | NULL |
| 345678901234 | Data | ServiceProv1 |
| | Voice | ServiceProv2 |
| | Text Messaging | ServiceProv3 | vii. Take Additional Actions

At optional step 516, provisionable-services clearinghouse 108 may take one or more additional actions. For example, given the information available to the provisionable-services clearinghouse 108, it may be capable of providing one or more beneficial functions to a user associated with an MD such as MD 102 and/or one or more service providers such as service providers A-C 202-206. For example, assuming additional information was provided for each of the service types and service providers of Table 4, an updated record structure for use at optional step 516 may include:

TABLE 5

A Further-Updated Provisionable-Services-Clearinghouse Record-Structure Example

| MD Identifier | Service Type | Service Provider | Contract Expiration | Early-Termination Fee |
|---|---|---|---|---|
| 012345678901 | Voice | NULL | | |
| | Data | NULL | | |
| | Text Messaging | NULL | | |
| 345678901234 | Data | ServiceProv1 | Feb. 2, 2020 | $200 |
| | Voice | ServiceProv2 | Feb. 2, 2019 | $100 |
| | Text Messaging | ServiceProv3 | None | None |

Provisionable-services clearinghouse 108 may use the additional information illustrated in Table 5 above, such as contract duration (in this example, embodied as a contract expiration date) and early-termination fee, among other possible additional information, to provide additional beneficial functions. For example, provisionable-services clearinghouse 108 may allow service providers themselves to subscribe to a service according to which they can retrieve information regarding MDs subscribed to one particular service (such as voice), but not yet subscribed to another particular service (such as data). Service providers could then use this information to more efficiently directly market their own respective services to MDs that have not yet subscribed to that other particular service.

In at least one embodiment, service provider C 206 may be provided with early-termination-fee information for those MDs that are already subscribed to a particular service with another service provider, and could use this information in identifying (1) users associated with MDs having low enough early-termination fees such that it would be profitable for the offering service provider itself to actually pay a given user's early-termination fee to gain that user as a subscriber or (2) users associated with MDs having low enough early-termination fees such that the offering service provider may well be able to convince that user that they would save money by paying the early-termination fee themselves and switching service to the offering service provider. And certainly many other possibilities exist as well.

Furthermore, a given service provider could subscribe to a service according to which provisionable-services clearinghouse 108 sends that service provider notices that identify MDs having contract durations that are about to expire. In this way, that service provider could more efficiently market its products and services to those MD users that may be in a position to be more likely open to switching service providers.

Of course, users could also directly subscribe to such services. For example, a user associated with MD 102 may wish to be notified when a particular service's contract duration is about to expire, so that the user may research potentially-better deals with other service providers, and/or for one or more other reasons. Additionally or alternatively, a user may wish to subscribe to offers from service providers for one or more services to which they have not yet subscribed. If a particular offer is viewed favorably by the user, the user could immediately cause the identified type of service and identified service provider to be provisioned via the provisionable-services clearinghouse 108. Other possibilities exist as well.

b. An Exemplary MD Service-Provider Selection Method and Apparatus

FIG. 6 depicts a flowchart in accordance with at least one embodiment. In particular, FIG. 6 depicts a method 600 for an MD 102 to communicate with one or more different service providers dependent upon which one or more different services are indicated in a given transmission request.

As shown in FIG. 6, method 600 begins at step 602, when a transmission request is generated within MD 102. At step 604, the MD 102 identifies a service provider associated with the transmission request, and at step 606, identifies a communication interface for communicating with the identified service provider. At step 608, the MD 102 transmits communications associated with the transmission request via the identified communication interface and identified service provider. These steps are further described below.

At step 602, a transmission request is generated by MD 102. The request may be generated via one or more programs stored in program logic 416 and being executed by processor 404 of MD 102. For example, an operating system may generate a transmission request to download a software update over a data connection, an instant-messaging program may generate a transmission request to transmit an instant message to an identified destination device, a voice-communication program may generate a transmission request to transmit voice data over a cellular voice channel. And so on.

At step 604, MD 102 identifies a service provider associated with the transmission request. For example, given the subscription status of the MD with MD identifier 345678901234 set forth in Table 5 above, a data request is associated with service provider ServiceProv1, a voice request is associated with ServiceProv2, and a text-messaging request is associated with ServiceProv3. MD 102 may maintain a similar record as set forth in Table 5 above, perhaps in program data 414 in data storage 406, for determining which service provider (and thus which communication interface and network) to use for a corresponding transmission request. Assuming, for example, that the transmission request is a software-update request generated by an operating system, the processor 404 may access the record in program data 414, and determine that the transmission request is a data request and should be associated with ServiceProv1.

Once the service provider has been identified, MD 102 identifies a communication interface for communication with the identified service provider at step 606. For example, assuming ServiceProv1 provides data services to MD 102 using a WiMAX protocol, MD 102 may identify an interface in wireless-communications interface 402 capable of communicating with ServiceProv1 via the WiMAX protocol. The same would hold true for other protocols, such as CDMA, LTE, EV-DO, IEEE 802.11, etc.

At step 608, MD 102 begins to transmit communications associated with the transmission request via the identified communication interface and identified service provider (e.g., the WiMAX interface and ServiceProv1). Independent of the service type or service provider, MD 102 may be configured to provide a same MD identifier in initiating or continuing service with the networks associated with the service providers (e.g., ESN, IMEI, MEID, etc.). An advantage of using the same MD identifier on each of these disparate networks is that it allows for the provisionable-services clearinghouse 108 to more efficiently and effectively coordinate services across service providers, such as among service providers A-C 202-206. Other advantages exist as well. And other types of communications protocols, interfaces, and requests could be used as well.

3. Conclusion

In accordance with the foregoing embodiments, a provisionable-services clearinghouse is provided that functions to authorize, manage, and broker services for and between a plurality of service providers. As a result, MDs can more easily, quickly, and efficiently sign up for initial services from one or more service providers, transfer services among service providers, and access information regarding potential services and service providers.

Various exemplary embodiments have been described above. Those skilled in the art will understand, however, that changes and modifications may be made to those examples without departing from the scope of the claims.

The invention claimed is:

1. A provisionable-services clearinghouse comprising:
   a communication interface;
   a processor; and
   instructions, contained in data storage, that are executable by the processor for causing the clearinghouse to carry out steps including:
      maintaining in data storage a plurality of records that each identify (i) a respective mobile device, (ii) one or more types of service for which the respective mobile device can be provisioned, and (iii) a respective provider of each of the so-identified types of service for which the respective mobile device is currently provisioned;
      receiving a first provisioning request that identifies (i) a particular mobile device that itself is identified by a particular record from among the plurality of records, (ii) a first type of service, and (iii) a particular provider;
      accessing the particular record in response to receiving the first provisioning request;
      making a determination based on the particular record as to whether the first type of service is currently provisioned for the particular mobile device;
      if the determination is that the first type of service is not currently provisioned for the particular mobile device, then responsively (i) sending to the particular provider a second provisioning request that requests that the first type of service be provisioned for the particular mobile device and (ii) updating the particular record to reflect that the particular mobile device is currently provisioned to be provided the first type of service by the particular provider; and
      if the determination is that the first type of service is currently provisioned for the particular mobile device, then responsively transmitting an error indication to the particular provider, the error indication indicating that the first type of service is currently provisioned for the particular mobile device.

2. The provisionable-services clearinghouse of claim 1, wherein the one or more types of service for which at least one of the respective mobile devices can be provisioned comprise a data service, a voice service, an instant-messaging service, an audio-streaming service, and a video-streaming service.

3. The provisionable-services clearinghouse of claim 1, wherein the first provisioning request further identifies a contract duration associated with the first type of service and particular provider, and wherein if the determination is that the first type of service is not currently provisioned for the particular mobile device, then the clearinghouse responsively updates the particular record to reflect the contract duration.

4. The provisionable-services clearinghouse of claim 3, the steps further including:
   within the contract duration, receiving a third provisioning request identifying (i) the first type of service, (ii) the particular mobile device, and (iii) an intervening provider different from the particular provider; and
   responsive to receiving the third provisioning request within the contract duration, transmitting an error indication to one or both of the particular mobile device and the intervening provider, the error indication indicating that the particular mobile device is currently provisioned to be provided the first type of service by the particular provider.

5. The provisionable-services clearinghouse of claim 4, wherein the error indication specifies the contract duration, and further specifies an early-termination fee associated with the first type of service from the particular provider.

6. The provisionable-services clearinghouse of claim 4, the steps further including:
   prior to expiration of the contract duration, automatically transmitting a notification regarding a forthcoming expiration of the contract duration to one or more of the particular provider, the intervening provider, and the particular mobile device.

7. The provisionable-services clearinghouse of claim 1, wherein each of the plurality of records identifies a respective mobile device by at least one of an electronic serial number (ESN), an International Mobile Equipment Identity (IMEI), and a Mobile Equipment Identifier (MEID).

8. The provisionable-services clearinghouse of claim 1, the steps further including:
   receiving a third provisioning request identifying (i) the particular mobile device, (ii) a second type of service different from the first, and (iii) a second particular provider different from the particular provider;
   accessing the particular record in response to receiving the third provisioning request;
   making a second determination, based on the particular record, as to whether the second type of service is currently provisioned for the particular mobile device; and
   if the second determination is that the second type of service is not currently provisioned for the particular mobile device, then responsively (i) sending to the second particular service provider a fourth provisioning request that requests that the second type of service be provisioned for the particular mobile device and (ii) updating the particular record to reflect that the particular mobile device is currently provisioned to be provided the second type service by the second particular provider.

9. The provisionable-services clearinghouse of claim 8, wherein the first type of service is one of a data service and a voice service, and wherein the second type of service is the other of the data service and the voice service.

10. The provisionable-services clearinghouse of claim 1, wherein the first provisioning request further includes a first geographic indication identifying a first geographic region in which the first type of service will be provided to the particular mobile device by the particular provider, the steps further comprising:
   receiving a third provisioning request that identifies (i) the particular mobile device, (ii) the first type of service, (iii) a second particular provider, and (iv) a second geographic indication identifying a second geographic region not overlapping the first geographic region;

accessing the particular record in response to receiving the third provisioning request;

making a determination based on the particular record as to whether the first type of service is currently provisioned for the particular mobile device within the second geographic region; and if the determination is that the first type of service is not currently provisioned for the particular mobile device within the second geographic region, then responsively (i) sending to the second particular provider a fourth provisioning request that requests that the second type of service be provisioned for the particular mobile device and (ii) updating the particular record to reflect that the particular mobile device is currently provisioned to be provided the first type of service by the second particular provider within the second geographic region.

11. The provisionable-services clearinghouse of claim 1, the steps further including:

receiving a plurality of mobile-device identifiers associated with respective ones of a plurality of manufactured mobile devices; and creating a record for each of the plurality of mobile-device identifiers, each record including a plurality of type-of-service entries that are each initially not associated with any particular service provider.

12. A computer-implemented method of providing a provisionable-services clearinghouse, the method comprising:

maintaining in a data storage a plurality of records that each identify (i) a respective mobile device, (ii) one or more types of service for which the respective mobile device can be provisioned, and (iii) a respective provider of each of the so-identified types of service for which the respective mobile device is currently provisioned;

receiving a first provisioning request that identifies (i) a particular mobile device that itself is identified by a particular record from among the plurality of records, (ii) a first type of service, and (iii) a particular provider;

accessing the particular record in response to receiving the first provisioning request;

making a determination based on the particular record as to whether the first type of service is currently provisioned for the particular mobile device;

if the determination is that the first type of service is not currently provisioned for the particular mobile device, then responsively (i) sending to the particular provider a second provisioning request that requests that the first type of service be provisioned for the particular mobile device and (ii) updating the particular record to reflect that the particular mobile device is currently provisioned to be provided the first type of service by the particular provider; and if the determination is that the first type of service is currently provisioned for the particular mobile device, then responsively transmitting an error indication to the particular provider, the error indication indicating that the first type of service is currently provisioned for the particular mobile device.

13. The method of claim 12, wherein the one or more types of service for which at least one of the respective mobile devices can be provisioned comprise a data service, a voice service, an instant-messaging service, an audio-streaming service, and a video-streaming service.

14. The method of claim 12, wherein the first provisioning request further identifies a contract duration associated with the first type of service and particular provider, and wherein if the determination is that the first type of service is not currently provisioned for the particular mobile device, then the clearinghouse responsively updates the particular record to reflect the contract duration.

15. The method of claim 14, further comprising:

within the contract duration, receiving a third provisioning request identifying (i) the first type of service, (ii) the particular mobile device, and (iii) an intervening provider different from the particular provider; and responsive to receiving the third provisioning request within the contract duration, transmitting an error indication to one or both of the particular mobile device and the intervening provider, the error indication indicating that the particular mobile device is currently provisioned to be provided the first type of service by the particular provider.

16. The method of claim 15, wherein the error indication specifies the contract duration, and further specifies an early-termination fee associated with the first type of service from the particular provider.

17. The method of claim 15, further comprising, prior to the expiration of the contract duration, automatically transmitting a notification regarding a forthcoming expiration of the contract duration to one or more of the particular provider, the intervening provider, and the particular mobile device.

18. The method of claim 12, wherein each of the plurality of records identifies a respective mobile device by at least one of an electronic serial number (ESN), an International Mobile Equipment Identity (IMEI), and a Mobile Equipment Identifier (MEID).

19. The method of claim 12, further comprising:

receiving a third provisioning request identifying (i) the particular mobile device, (ii) a second type of service different from the first, and (iii) a second particular provider different from the particular provider;

accessing the particular record in response to receiving the third provisioning request;

making a second determination, based on the particular record, as to whether the second type of service is currently provisioned for the particular mobile device; and if the second determination is that the second type of service is not currently provisioned for the particular mobile device, then responsively (i) sending to the second particular service provider a fourth provisioning request that requests that the second type of service be provisioned for the particular mobile device, and (ii) updating the particular record to reflect that the particular mobile device is currently provisioned to be provided the second type service by the second particular provider.

20. The method of claim 19, wherein the first type of service is one of a data service and a voice service, and wherein the second type of service is the other of the data service and the voice service.

21. The method of claim 12, wherein the first provisioning request further includes a first geographic indication identifying a first geographic region in which the first type of service will be provided to the particular mobile device by the particular provider, the method further comprising:

receiving a third provisioning request that identifies (i) the particular mobile device, (ii) the first type of service, (iii) a second particular provider, and (iv) a second geographic indication identifying a second geographic region not overlapping the first geographic region;

accessing the particular record in response to receiving the third provisioning request;

making a determination based on the particular record as to whether the first type of service is currently provisioned for the particular mobile device within the second limited geographic region; and if the determination is that the first type of service is not currently provisioned for the particular mobile device within the second geographic region, (i) sending to the second particular provider a fourth provisioning request that requests that the second type of service be provisioned for the particular mobile device and (ii) updating the particular record to reflect that the particular mobile device is currently provisioned to be provided the first type of service by the second particular provider within the second geographic region.

22. The method of claim 12, further comprising:

receiving a plurality of mobile-device identifiers associated with respective ones of a plurality of manufactured mobile devices; and creating a record for each of the plurality of mobile-device identifiers, each record including a plurality of type-of-service entries that are each initially not associated with any particular service provider.

\* \* \* \* \*